March 11, 1952 — O. J. POUPITCH — 2,589,028
QUICKLY OPERABLE FASTENER
Filed May 17, 1947 — 2 SHEETS—SHEET 2
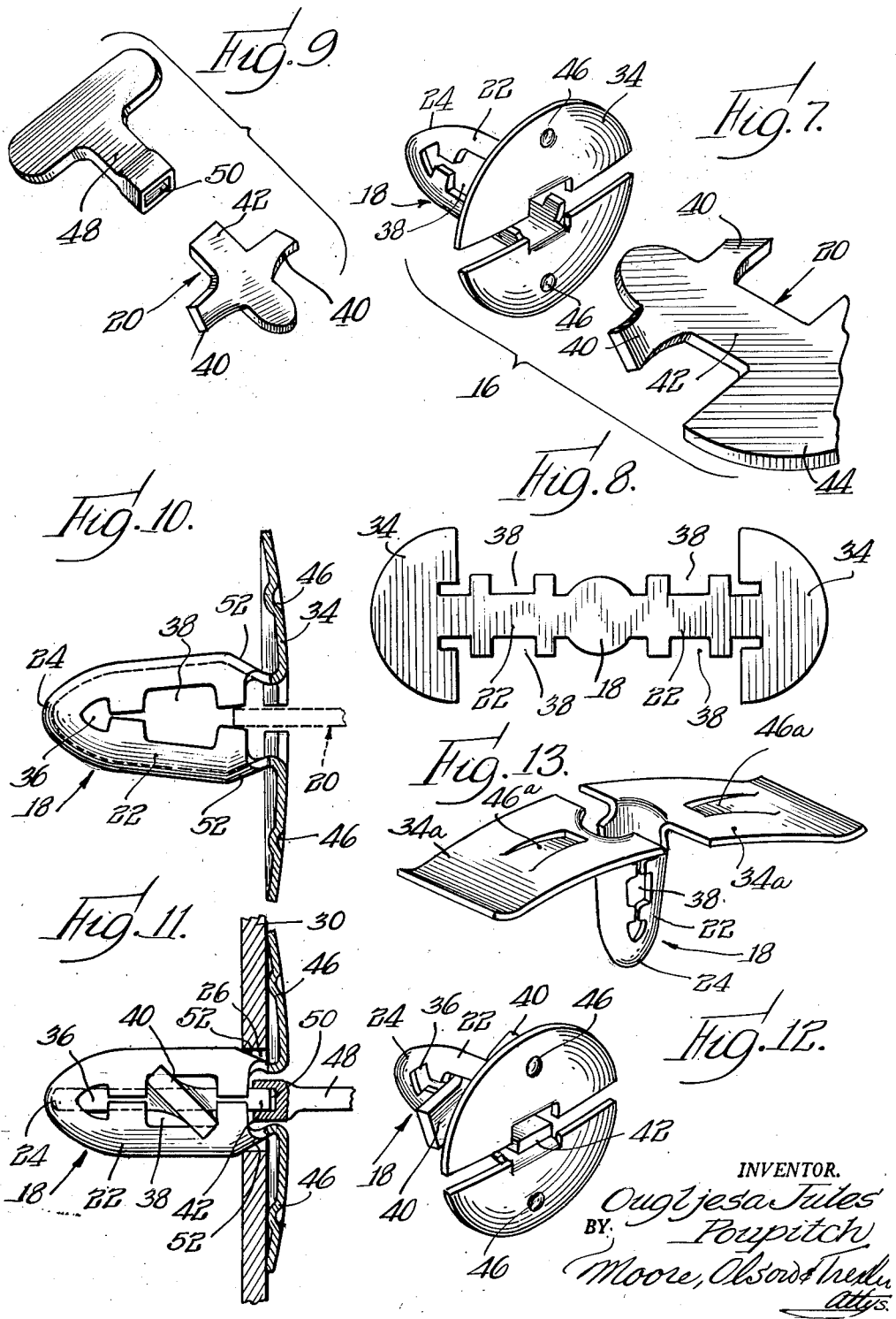
INVENTOR.
Ougljesa Jules Poupitch
BY Moore, Olson & Trexler
Attys.

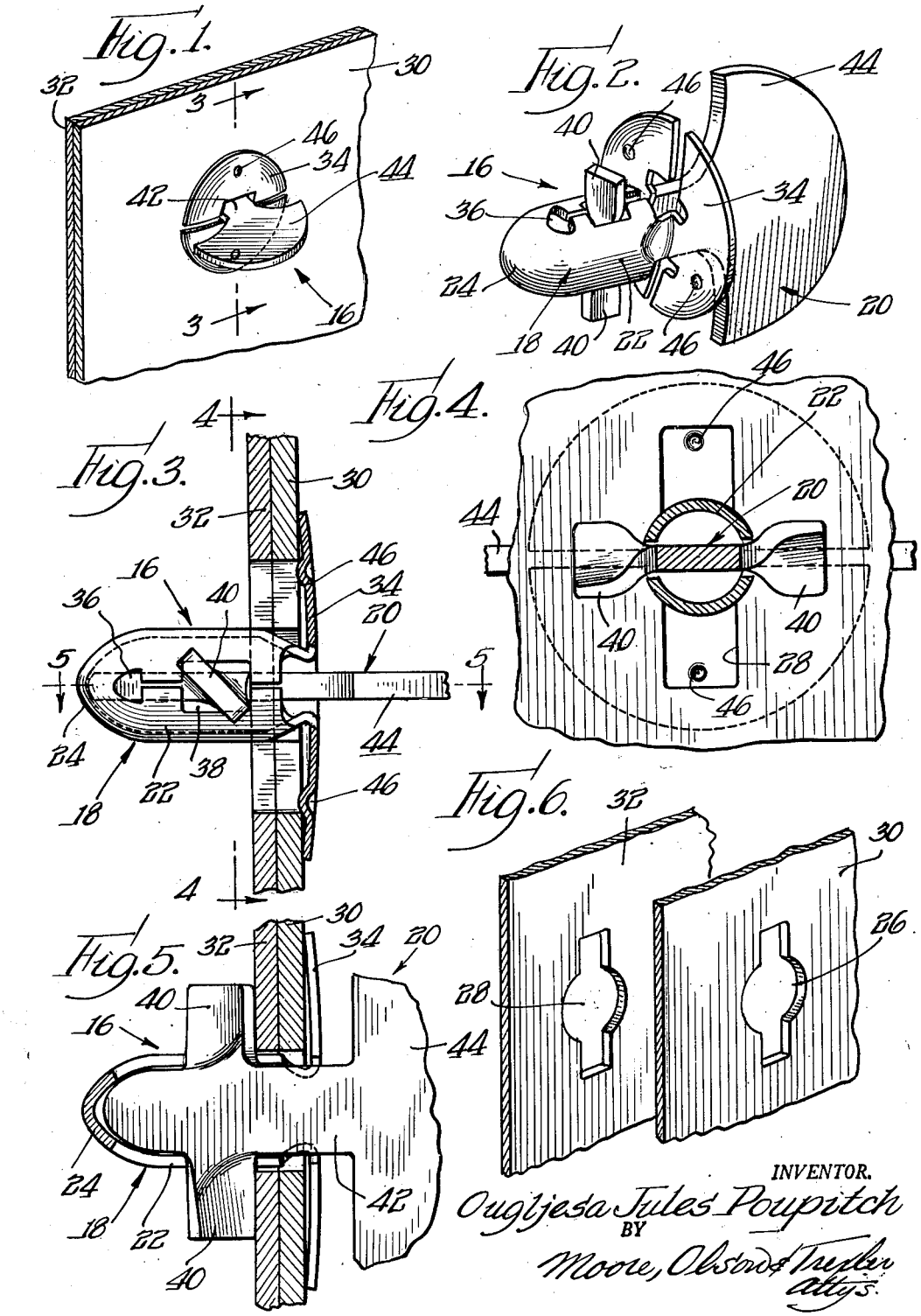

Patented Mar. 11, 1952

2,589,028

UNITED STATES PATENT OFFICE 2,589,028

QUICKLY OPERABLE FASTENER

Ougljesa Jules Poupitch, Chicago, Ill., assignor to Illinois Tool Works, Chicago, Ill., a corporation of Illinois Application May 17, 1947, Serial No. 748,691

4 Claims. (Cl. 24—221)

This invention relates generally to rotary fasteners, and more particularly to quickly operable fasteners requiring only partial rotation for locking or unlocking purposes.

Certain types of quickly operable fasteners have been well known in the art as cowl fasteners. These devices have been used commercially to a considerable extent in the aircraft industry for detachably securing cowling parts. These prior devices usually consist of a rotary stud member having a cross-pin which cooperates with a separate spring part usually secured to the fixed work piece. In one position the cross-pin lockingly engages the spring part, and when turned 90° is adapted to be disengaged from said work piece. The present invention is concerned with improvements of the above mentioned cowl fasteners, and one of the important objects is to provide a quickly operable fastener which is considerably less expensive than those heretofore available and which is far more simple in construction yet exceedingly strong.

More specifically, the invention contemplates a quickly operable fastener of the type referred to above which may be produced entirely from sheet metal stock, and to this end it is proposed to employ sheet metal material in the form of a hollow shank portion and a head at one end formed integral therewith.

It is a further object of the present invention to provide a quickly operable fastener of improved simple construction which avoids the necessity of employing a separate spring locking part as has been heretofore in common use, and with this in view a fastener is in contemplation which may be inserted through registering apertures in work pieces and then partially rotated so as to clamp said work pieces together.

Another object is to provide a relatively simple quickly operable fastener as set forth above, which is in the nature of an all-purpose fastener capable of being used in any instance where work pieces such as sheets may be conveniently provided with registering apertures.

It is also an object of the present invention to provide a quickly operable fastener in which a resilient head portion on one side of the work piece is adapted to cooperate with a rotary lug on the opposite side of the work piece to establish a firm resilient clamp as an incident to partial stud rotation; it is also proposed to incorporate in a fastener of this type simple and effective means for locking the fastener against inadvertent retrograde movement after it has once been rotated to its work locking position.

The foregoing and other objects and advantages will be more apparent from the following detailed description when considered in connection with the accompanying drawings, wherein:

Fig. 1 is a perspective view showing a fastener of the present invention applied to a pair of work sheets;

Fig. 2 is a perspective view of the fastener device illustrated in Fig. 1, the two constituent elements of the fastener, namely, the sheet metal hollow shank member and stud member, in combined relation;

Fig. 3 is a vertical sectional view showing the device of Fig. 2 in locking association with a pair of work sheets;

Fig. 4 is a vertical transverse sectional view taken substantially along the line 4—4 of Fig. 3;

Fig. 5 is a horizontal sectional view taken substantially along the line 5—5 of Fig. 3;

Fig. 6 is a perspective view illustrating a pair of work pieces provided with registrable openings for accommodating the fastener illustrated in Figs. 2 to 5, inclusive;

Fig. 7 is a perspective view disclosing the constituent elements of the fastener in detached relation;

Fig. 8 is a plan view of a blank of sheet metal stock adapted to be bent and formed into the hollow shank and head portion of the fastener;

Fig. 9 is a perspective view illustrating a modified stud member and a tool used to impart partial rotation to the stud;

Fig. 10 is a side view of the sheet metal shank and head portion of the fastener before the complete assembly therewith of the stud member, the head portion being broken away for purposes of clearance;

Fig. 11 shows the fastener of Fig. 10 and its complementary stud member inserted within the outer work sheet, to more clearly illustrate the manner in which this preliminary association with the work piece causes the hollow shank to be flexed inwardly from the normally expanded position shown in Fig. 10;

Fig. 12 is a perspective view of the rotary fastener of Fig. 11 before insertion within the work; and Fig. 13 is a perspective view illustrating a modified form of hollow shank and head structure.

Referring now to the drawings more in detail wherein like numerals have been employed to designate similar parts throughout the various views, it will be seen that one embodiment of the invention is illustrated by the rotatable fastener device designated generally by the numeral 16, Fig. 2. This fastener device 16 consists of two parts, one a headed hollow shank member 18 and the other a rotary stud member 20. The headed shank member 18 includes a hollow tubular shank section 22 having a rounded entering end 24 formed to facilitate insertion within work apertures, as, for example, apertures 26 and 28 of work sheets 30 and 32, respectively. The opposite extremity of the shank section 22 is provided with a laterally extending or flared portion providing a head section 34. The head section 34 comprises two substantially semi-circular halves, the outer margins of which are flexed toward the entering end 24. In other words, the head 34 partakes of a dished configuration, as readily seen from the cross-sectional view in Fig. 10.

It will be apparent that the hollow shank and head sections just described may be formed from a sheet metal blank of the type illustrated in Fig. 8. The central portion of the blank provides the entering end 18. The elongated portions on opposite sides of the central portion are bent into axial relation and concavely shaped to provide the shank portion 22, and the opposite extremities of the blank provide the head section 34. In side elevation the shank and head sections, when detached from the work piece, appear as illustrated in Fig. 10. From this figure it will be noted that diametrically positioned openings 36 facilitate the folding of the blank and the formation of the closed entering end 24, whereas diametrically positioned openings 38 are provided to accommodate lateral lug portions 40 extending outwardly from a stem 42 of the stud member 20. It will be apparent from Fig. 10 that the stud member 40 may be telescopically associated with the hollow shank portion 22 by initially inserting the entering end of the stud, as illustrated by the dotted lines in Fig. 10. After the stud has been completely inserted within the hollow shank portion 22, the parts assume the positions illustrated in Fig. 2. The stud 20 is also provided with a head or wing 44 to facilitate the application of turning force to the fatsener. It will be noted that the lugs 40 are preferably twisted out of the plane of the stud stock.

In using the fastener 16 to secure work sheets or pieces 30—32 together, the apertures 26—28 thereof are first brought into registration. It will be seen that each of these apertures includes a central circular portion for receiving the hollow shank 22 and diametrically positioned radial portions for accommodating the lugs 40. The axial distance between the lugs 40 and the underside of the margin of the head 34 must be somewhat less than the total thickness of the combined work sheets 30—32. Thus, the fastener is initially inserted until the outer margin of the head engages the surface of the work piece 30, and as rotation is imparted to the stud and shank members as a unit the inclined surfaces of the lugs serve as cams in drawing the shank inwardly against the resiliency of the head 34. That is to say, as the fastener assembly is rotated through 90° from its position of initial insertion, the lugs 40 not only serve to lock the parts against axial withdrawal from the registered apertures of the work, but also serve to firmly and resiliently clamp the work pieces against each other as the result of the yielding resistance of the head 34.

To insure the fastener assembly 16 against inadvertent retrograde rotation, detents 46 are provided in the head 44. When the fastener assembly 16 occupies the position illustrated in Figs. 3 and 4, these detents 46 interlock with the radial portions of the aperture 26. In order for the fastener assembly to experience subsequent rotation the turning force must be sufficient to overcome the interlocking of these detents with the radial apertures. From the foregoing it will be understood that the above described quickly operable rotary fastener includes a hollow shank portion designed for insertion within the aperture of a work piece and a head portion or section at one extremity of the shank, said stud and head portions providing a central aperture or chamber for accommodating a stud member having a lateral lug. It will also be understood that these lateral lugs are accommodated by openings in the shank portion positioned at a point spaced axially from the head portion a distance preferably less than the thickness of the combined thicknesses of the work sheets.

In instances where it is desirable, the wing or head portion 44 of the stud member may be eliminated. Thus, where it is desirable to have the heads of the fastener in substantial flush relationship with the work surface, it would be preferable to employ the stud member illustrated in Figs. 9, 11 and 12, wherein the wing has been eliminated. In the use of such embodiments a turning tool designated by the numeral 48 may be employed, Figs. 9 and 11. This tool is provided with a socket 50 to receive the stem portion 42 of the stud.

In Fig. 11 the fastener assembly is shown in operative association with the work piece or sheet 30. Particular attention is directed to the self-retaining feature of the shank member 18 after it has been initially inserted within the aperture of the work part 30. As previously pointed out, the two half sections which combine to form the hollow shank portion 22 are normally separated from each other as illustrated in Fig. 10. This serves the dual purpose of facilitating telescopic association therewith of the stud member, and secondly, resilient self-retention within the work sheet 30. The tendency for the shank portions to expand within the aperture 26 forces shoulder portions 52 against the work, and thereby prevents the fastener assembly from inadvertently becoming separated from the work sheet. This feature is of particular significance in instances where the work sheet 30 forms a removal or detachable part such as a cover member. In such instances, it is often desirable to retain all of the fastener members in the removable sheet part.

In Fig. 13 a slightly modified head construction is shown. In this embodiment the head is designated by the numeral 34a and the detents by the numeral 46a. The head sections 34a, like the head sections 34 previously described, are normally flexed toward the entering end of the hollow shank, so as to enable resilient clamping action when the fastener assembly is operatively associated with the work sheets. The outer margins of the head or wing portions 34a are preferably bent outwardly to present a rounded, as distinguished from a sharp or rough surface to the work part. In all other respects the device illustrated in Fig. 13 conforms structurally with the fastener part previously described.

From the foregoing it will be appreciated that the present invention contemplates the provision of a quickly operable rotary fastener of extremely simple, practical design. By stamping and forming all of the constituent parts from sheet metal, economy in manufacture is assured. Because the device is formed from sheet metal, it is very light in weight, yet sturdy in construction. Embodying cam surfaces in the lug portions preclude the necessity of using separate spring locking devices and make it possible to clampingly engage opposite surfaces of the work parts. The resilient sheet metal head cooperating with a lug member projecting outwardly from a sheet metal shank portion, make for efficiency in use and economy in manufacture.

Obviously, the invention is not limited to the specific embodiments disclosed herein, but is capable of other changes without departing from the spirit and scope of the appended claims.

The invention is hereby claimed as follows:

1. A quickly operable rotary fastener including a hollow shank portion with a closed entering end, a head portion on the opposite extremity of said shank portion, said shank and head portions consisting of a single strip of sheet metal stock folded intermediate its ends to provide oppositely disposed shank halves and folded at its opposite extremities to present said head portion, a sheet metal stud member consisting of a stem enclosed within said shank portion and oppositely disposed lugs projecting through and outwardly from said shank portion at a point spaced from the head portion, said lugs presenting work engaging cam surfaces, and means on the fastener for interlocking with an apertured work piece to secure the fastener against inadvertent retrograde rotation.

2. A two-piece sheet metal quickly operable rotary fastener unit including a hollow shank adapted for insertion within the aperture of a work part, an axially resilient head on one extremity of said shank, said shank having a longitudinal stud accommodating recess separating the head and shank into transversely yieldable sections, a stud member including a stem positioned within said hollow shank and an integral lateral work engaging lug extending through said longitudinal recess at a point spaced axially from the head, said shank sections being expandible to permit insertion of said lug, and means associated with said recess for resisting axial separation of the stud and shank, the stem of said stud having means in the vicinity of said head engageable for rotating the stud and hollow shank as a unit to effect clamping of a complementary work piece between said lug and head.

3. A two-piece sheet metal quickly operable rotary fastener unit as set forth in claim 2, wherein the means on the stud in the vicinity of the shank head for rotating the stud and shank as a unit consists of an enlarged manually grippable portion extending axially beyond said head.

4. A two-piece sheet metal quickly operable fastener unit as set forth in claim 2, wherein the entering end portion of the shank presents a tapered nose portion to facilitate initial insertion within a complementary work aperture.

OUGLJESA JULES POUPITCH.

REFERENCES CITED

The following references are of record in the file of this patent:

UNITED STATES PATENTS

| Number | Name | Date |
|---|---|---|
| 1,666,783 | Kries | Apr. 17, 1928 |
| 1,833,554 | Baynes | Nov. 24, 1931 |
| 2,233,242 | Burke | Feb. 25, 1941 |
| 2,252,932 | Johnson | Aug. 19, 1941 |
| 2,258,068 | Zahodiakin | Oct. 14, 1941 |
| 2,318,840 | Del Camp | May 11, 1943 |
| 2,373,380 | Cameron | Apr. 10, 1945 |
| 2,378,638 | Johnson | June 19, 1945 |
| 2,408,340 | Poupitch | Sept. 24, 1946 |
| 2,486,670 | Nigg | Nov. 1, 1949 |
| 2,556,988 | Swanson | June 12, 1951 |

FOREIGN PATENTS

| Number | Country | Date |
|---|---|---|
| 564,108 | Great Britain | Sept. 13, 1944 |
| 875,520 | France | Sept. 25, 1942 |